United States Patent [19]

Galecki et al.

[11] 3,891,747

[45] June 24, 1975

[54] CHLORATE REMOVAL FROM ALKALI METAL CHLORIDE SOLUTIONS

[75] Inventors: Glenn E. Galecki, La Grange, Ill.; Sonia R. Oberson, West Haven, Conn.

[73] Assignee: Olin Corporation, New Haven, Conn.

[22] Filed: Oct. 11, 1973

[21] Appl. No.: 405,376

[52] U.S. Cl. ............... 423/499; 423/199; 423/202; 423/551
[51] Int. Cl. ............................................. C01d 3/14
[58] Field of Search ........... 423/499, 199, 184, 202, 423/551, 552

[56] References Cited
UNITED STATES PATENTS 3,501,266   3/1970   Gaska et al. ..................... 423/499 X

OTHER PUBLICATIONS

J. Amer. Chem. Soc., Vol. 47, May 1925, pages 1319–1325.

Primary Examiner—Edward Stern
Attorney, Agent, or Firm—Donald F. Clements; Thomas P. O'Day; James B. Haglind

[57] ABSTRACT

A process for reducing the chlorate impurities content in aqueous solutions of alkali metal chlorides by the addition of a small but effective amount of an alkali metal hydrosulfite. The resulting treated solution after adjusting the pH to that below 6 is useful as an electrolyte in the production of chlorine in electrolytic cell processes.

10 Claims, No Drawings

CHLORATE REMOVAL FROM ALKALI METAL CHLORIDE SOLUTIONS

This invention relates to improvements in the purification of aqueous solutions of alkali metal chlorides. More particularly, it concerns an improved method for removing chlorate impurities from aqueous solutions of alkali metal chlorides. The alkali metal chloride solutions thus treated may be employed in electrolytic cell processes for producing chlorine.

Aqueous solutions of alkali metal chlorides, for example, those obtained as effluents from electrolytic processes used in chlorine manufacture, contain varying amounts of chlorate which are formed during the electrolysis of brine. Prior to reusing the alkali metal chloride solutions in the electrolytic process, it is frequently necessary to remove or reduce the chlorate content to a level which will not cause a reduction in current efficiency or adversely effect the corrosion rate of anodes. This is particularly important in electrolytic cells having mercury cathodes where a large percentage of the alkali metal chloride brine is continuously recycled. Successful operation of mercury cells requires brine purity to be carefully controlled.

It is known to remove chlorate from solutions obtained in the electrolysis of alkali metal chlorides by the addition of sulfurous acid, its salts or hydrogen sulfide, as disclosed in British Pat. No. 506,394, issued to I. G. Farbenindustries. In this process sulfurous acid prepared by dissolving sulfur dioxide gas in a neutral or weakly acid electrolyte solution, reacts with chlorate present in the electrolyte. The use of alkali metal hydrosulfites in removing chlorate from alkali metal chloride solutions has not been reported.

It is a primary object of this invention to provide an improved method for reducing chlorate impurities in aqueous alkali metal chloride solutions.

It is another object of the invention to provide a method of removing chlorate impurities from aqueous solutions of alkali metal chlorides obtained as effluents from electrolytic processes for the production of chlorine.

A further object of the invention is to provide an improved method for reducing chlorate impurities in acidic solutions of alkali metal chlorides.

These and other objects of the invention will be apparent from the following description of the invention. It has now been discovered that the foregoing objects are accomplished when an aqueous solution of an alkali metal chloride containing excess chlorate impurities is reacted with sufficient alkali metal hydrosulfite to reduce the excess chlorate impurities. Upon adjustment of the acidity of this solution it may be used as feed to electrolytic processes for the production of chlorine.

More in detail, any aqueous solution of an alkali metal chloride containing an excess of chlorate impurities can be treated in accordance with the process of this invention. Typical examples of alkali metal chlorides are sodium chloride, potassium chloride and lithium chloride. In order to simplify the disclosure of the invention, it will be described hereinafter in terms of sodium chloride which is the preferred component of the aqueous solution. While any solution of sodium chloride containing an excess of chlorate impurities may be treated by the process of the present invention, preferably treated are aqueous solutions containing from about 200 to about 330 gms. of sodium chloride per liter.

The aqueous alkali metal chloride solutions treated by the process of the present invention may contain any amount of chlorate impurities. In a typical aqueous solution of sodium chloride as obtained as an effluent from a mercury cathode electrolytic cell in the production of chlorine, chlorate is usually present as sodium chlorate in amounts from about 1 to about 40 gms. per liter of aqueous sodium chloride solution. Usually the amount of sodium chlorate is from about 2 to about 20 gms. per liter of sodium chloride solution.

While the aqueous alkali metal chloride solutions treated may be acidic or basic, it is preferred to reduce the excess chlorate in an acidic solution having a pH of less than 6, for example, a pH of from about 1 to about 3.

Excess chlorate impurities in the aqueous solutions of sodium chloride are removed by the addition of an alkali metal hydrosulfite compound such as sodium hydrosulfite, potassium hydrosulfite or lithium hydrosulfite or mixtures thereof. The chlorate reducing proportion of alkali metal hydrosulfite added to the aqueous sodium chloride solution is dependent upon the amount of excess chlorate present in the solution. Generally, the proportion of alkali metal hydrosulfite compound added is at least an amount sufficient to remove the excess chlorate impurities present. Suitable proportions of alkali metal hydrosulfite employed include, for example, a weight ratio of alkali metal hydrosulfite to sodium chlorate present in the solution of from about 0.5:1 to about 10:1 and preferably from about 2:1 to about 5:1. After treatment, the aqueous solution of sodium chloride generally contains less than about 5 gms. of sodium chlorate per liter and preferably from about 0.1 to about 2 gms. of sodium chlorate per liter.

The alkali metal hydrosulfite may be added in any suitable form, for example as the solid alkali metal hydrosulfite or as an aqueous solution. For convenience of handling, it is preferred to add the alkali metal hydrosulfite as an aqueous solution. The alkali metal hydrosulfite solution used may be of any desired concentration. Suitable alkali metal hydrosulfite solutions include, for example, those containing from about 100 to about 150 gms. of alkali metal hydrosulfite per liter of solution.

The alkali metal hydrosulfite may be added to the excess chlorate-containing sodium chloride solution at any suitable temperature, for example, at a temperature of from about 40° to about 120°C. and preferably at a temperature of about 50° to about 100°C.

Any suitable reaction time may be used to permit reduction of the chlorate impurities present by the alkali metal hydrosulfite, for example, a reaction time of from about 3 to about 30 and preferably from about 10 to about 20 minutes.

Following addition of the alkali metal hydrosulfite, a reaction takes place in which the chlorate is reduced. While the exact mechanism of the reaction is not known, the chlorate present is believed to be reduced to chloride and the alkali metal hydrosulfite forms alkali metal sulfate along with other reaction products.

When the process of the present invention is used in treating sodium chloride solutions containing excess chlorate obtained as effluents from an electrolytic process for the production of chlorine, all or a portion of the effluent may be treated with the alkali metal hydrosulfite. For example, the treatment of a chlorate impurity containing portion of effluent of from about 0.1 to about 40 percent of the total effluent may be treated. This amount is preferably from about 0.3 to about 20 percent of the total effluent present. Where a large portion of the effluent is treated by the addition of alkali metal hydrosulfite, it may be advantageous to employ a sulfate removal step such as that employed in U.S. Pat. Nos. 3,497,724 or 3,378,336.

It has been found that the alkali metal chloride solutions produced by the present invention having the reduced chlorate ion content can be reused as brines in electrolytic processes for the production of chlorine in mercury cells, diaphragm cells and the like.

The following examples are presented to illustrate the invention more fully. All parts and percentages are by weight unless otherwise indicated.

EXAMPLES 1–5

To each of five reaction vessels, each containing 10 milliliters of an aqueous solution containing 26 percent sodium chloride, a known amount of sodium chlorate was added and dissolved. The solution was heated to about 60°C. and 0.2 N hydrochloric acid added to acidify the solution to the desired pH value. An aqueous solution of sodium hydrosulfite was gradually added to the sodium chloride solution with stirring. The ensuing reaction was allowed to proceed for about 15 minutes. The solutions were then analyzed for the amount of remaining chlorate. Table I below indicates the pH of the aqueous sodium chloride solution, the weight of sodium chloride dissolved in the solution, the weight of sodium hydrosulfite added, the weight ratio of sodium hydrosulfite to sodium chlorate, and the present reduction of chlorate originally present for Examples 1–5.

Table I

Percent of Chlorate Reduction in Aqueous Sodium Chloride Solutions

| Example No. | pH | Mg. $NaClO_3$ | Mg. $Na_2S_2O_4$ | Weight Ratio $Na_2S_2O_4$: $NaClO_3$ | Percent Chlorate Reduction |
|---|---|---|---|---|---|
| 1 | 1 | 8.8 | 40.0 | 4.5:1 | 99.8 |
| 2 | 1 | 12.8 | 40.0 | 3.1:1 | 99.4 |
| 3 | 1 | 14.8 | 40.0 | 2.7:1 | 96.4 |
| 4 | 1 | 18.8 | 40.0 | 2.1:1 | 85.7 |
| 5 | 3 | 8.0 | 16.0 | 2.0:1 | 40.0 |

We claim:
1. A process for reducing the chlorate impurities in an aqueous solution of an alkali metal chloride which comprises admixing said aqueous solution with a chlorate reducing proportion of an alkali metal hydrosulfite to form an aqueous solution of an alkali metal chloride containing an alkali metal sulfate, wherein said chlorate reducing proportion is a weight ratio of said alkali metal hydrosulfite to said chlorate of from about 0.5:1 to about 10:1.

2. The process of claim 1 in which the pH of said aqueous solution of alkali metal chloride is less than about 6.

3. The process of claim 2 in which said pH is from about 1 to about 3.

4. The process of claim 3 wherein said weight ratio of said alkali metal hydrosulfite to said chlorate is from about 2:1 to about 5:1.

5. The process of claim 3 in which said aqueous solution of an alkali metal chloride is an effluent from an electrolytic cell for the production of chlorine, said effluent containing from about 1 to about 40 grams of chlorate per liter of effluent.

6. The process of claim 5 in which a portion of from about 0.1 to about 40 percent of said effluent is treated.

7. The process of claim 4 in which the temperature of said aqueous solution of an alkali metal chloride is from about 40° to about 120°C.

8. The process of claim 7 in which said alkali metal hydrosulfite is sodium hydrosulfite.

9. The process of claim 8 in which said alkali metal chloride is sodium chloride.

10. The process of claim 9 in which said chlorate is sodium chlorate.

* * * * *